United States Patent
Tornatta et al.

(10) Patent No.: US 8,018,983 B2
(45) Date of Patent: Sep. 13, 2011

(54) TUNABLE DIVERSITY ANTENNA FOR USE WITH FREQUENCY HOPPING COMMUNICATIONS PROTOCOL

(75) Inventors: Paul A. Tornatta, Melbourne, FL (US); Mark T. Montgomery, Melbourne Beach, FL (US); Christopher H. Morton, Longwood, FL (US)

(73) Assignee: Sky Cross, Inc., Melbourne, FL (US)

( * ) Notice: Subject to any disclaimer, the term of this patent is extended or adjusted under 35 U.S.C. 154(b) by 886 days.

(21) Appl. No.: 11/971,573

(22) Filed: Jan. 9, 2008

(65) Prior Publication Data
US 2009/0168847 A1 Jul. 2, 2009

Related U.S. Application Data

(60) Provisional application No. 60/884,216, filed on Jan. 9, 2007.

(51) Int. Cl.
*H04B 1/713* (2011.01)

(52) U.S. Cl. ......... 375/136; 375/132; 375/316; 375/347

(58) Field of Classification Search ................. 375/136, 375/132, 316, 347
See application file for complete search history.

(56) References Cited

U.S. PATENT DOCUMENTS

| | | | |
|---|---|---|---|
| 6,061,025 A | 5/2000 | Jackson et al. | |
| 6,333,719 B1 | 12/2001 | Varadan et al. | |
| 6,686,892 B1 * | 2/2004 | Lopez et al. | 343/791 |
| 6,915,116 B2 | 7/2005 | Wang et al. | |
| 7,561,903 B2 * | 7/2009 | Estrada | 455/575.2 |
| 2003/0083836 A1 * | 5/2003 | Spencer | 702/107 |
| 2003/0201843 A1 * | 10/2003 | Luen et al. | 333/35 |
| 2005/0088347 A1 * | 4/2005 | Vance et al. | 343/702 |
| 2006/0034163 A1 * | 2/2006 | Gore et al. | 370/208 |
| 2006/0132360 A1 * | 6/2006 | Caimi et al. | 343/700 MS |
| 2007/0160160 A1 * | 7/2007 | Kakura | 375/267 |
| 2008/0075146 A1 * | 3/2008 | Rofougaran | 375/135 |

OTHER PUBLICATIONS

Kakhura, WO2005/062510, Wireless communication system, wireless communication apparatus, and resource assignemtn method used therein, published Jul. 7, 2005.*

* cited by examiner

*Primary Examiner* — Chieh M Fan
*Assistant Examiner* — Siu Lee
(74) *Attorney, Agent, or Firm* — John L. DeAngelis; Beusse Wolter Sanks Mora & Maire, P.A.

(57) ABSTRACT

A sound reproducing device. The sound reproducing device for receiving a frequency-hopping signal having an instantaneous frequency within a hopping bandwidth. The sound reproducing device comprises a first antenna having a bandwidth including the hopping bandwidth for producing a first received signal and a second antenna tunable to frequencies within the hopping bandwidth responsive to an instantaneous hopping frequency. The second antenna produces a second received signal. The device further comprises a module for processing one or both of the first and second received signals to produce a signal for driving the sound reproducing device.

28 Claims, 4 Drawing Sheets

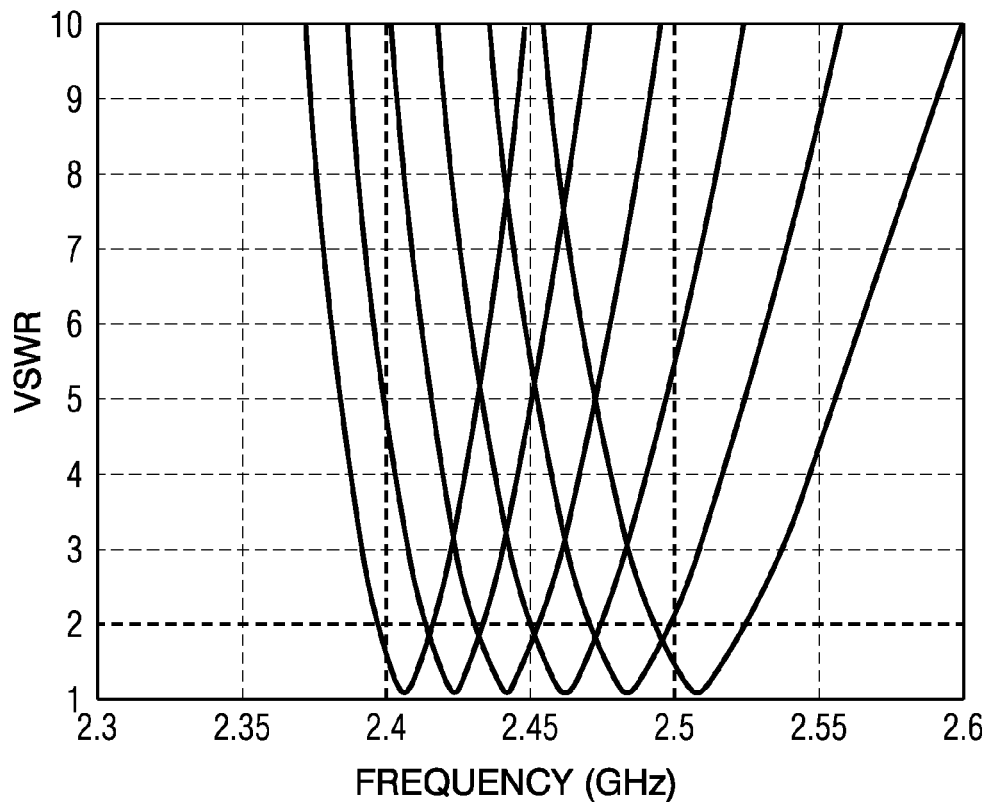
FIG. 9
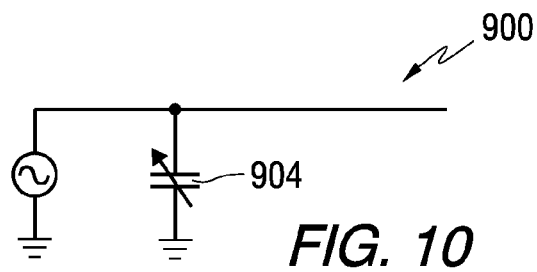
FIG. 10
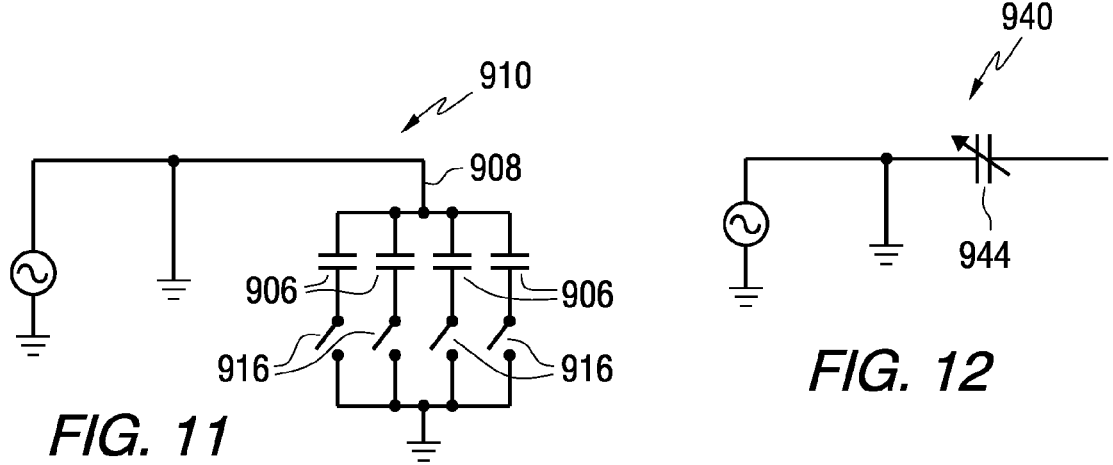
FIG. 11
FIG. 12

TUNABLE DIVERSITY ANTENNA FOR USE WITH FREQUENCY HOPPING COMMUNICATIONS PROTOCOL

REFERENCE TO RELATED APPLICATIONS

This application claims the benefit, under 35 U.S.C. 119 (e), of the provisional patent application entitled Tunable Diversity Antenna for use with Frequency Hopping Communications Protocol filed on Jan. 9, 2007 and assigned application No. 60/884,216.

FIELD OF THE INVENTION

The present invention is related generally to antennas for wireless communications devices and specifically to methods and apparatuses for controlling antenna parameters to improve performance of a frequency hopping communications device.

BACKGROUND OF THE INVENTION

It is known that antenna performance is dependent on the size, shape and material composition of the antenna elements, the interaction between elements and the relationship between certain antenna physical parameters (e.g., length for a linear antenna and diameter for a loop antenna) and the wavelength of the signal received or transmitted by the antenna. These physical and electrical characteristics determine several antenna operational parameters, including input impedance, gain, directivity, signal polarization, resonant frequency, bandwidth and radiation pattern. Since the antenna is an integral element of a signal receive and transmit path of a communications device, antenna performance directly affects device performance.

Generally, an operable antenna should have a minimum physical antenna dimension on the order of a half wavelength (or a multiple thereof) of the operating frequency to limit energy dissipated in resistive losses and maximize transmitted or received energy. Due to the effect of a ground plane image, a quarter wavelength antenna (or odd integer multiples thereof) operative above a ground plane exhibits properties similar to a half wavelength antenna. Communications device product designers prefer an efficient antenna that is capable of wide bandwidth and/or multiple frequency band operation, electrically matched (e.g., impedance matched) to the transmitting and receiving components of the communications system and operable in multiple modes (e.g., selectable signal polarizations and selectable radiation patterns).

Spread spectrum communications techniques (such as direct sequence spreading and frequency hopping) can be used to permit access by multiple users to the same communications channel. According to the frequency hopping technique, the instantaneous frequency of a transmitted information signal is shifted pseudorandomly over a hopping bandwidth with a predetermined minimum hopping distance between consecutive hops. The receiver employs the same hopping sequence to follow and receive the transmitted signal as it hops within the hopping bandwidth. Typically, the transmitting and receiving communications devices employ a single wideband antenna that is capable of adequate performance over the hopping bandwidth. A tunable antenna that tracks the hopping frequency in real time can have a narrower bandwidth as it needs to cover, at a minimum, only the instantaneous bandwidth and not the entire operating spectrum. A narrower bandwidth requirement is advantageous in that the antenna can be physically smaller, thereby providing additional out of channel signal rejection.

BRIEF DESCRIPTION OF THE DRAWINGS

The present invention can be more easily understood and the advantages and uses thereof more readily apparent when the following detailed description of the present invention is read in conjunction with the figures wherein:

FIG. 9 illustrates a communications frequency band for one embodiment of the invention.

FIGS. 10-12 illustrate embodiments of a planar inverted F antenna controllable according to the teachings of the present invention.

In accordance with common practice, the various described device features are not drawn to scale, but are drawn to emphasize specific features relevant to the invention. Like reference characters denote like elements throughout the figures and text.

DETAILED DESCRIPTION OF THE INVENTION

Figure 1:
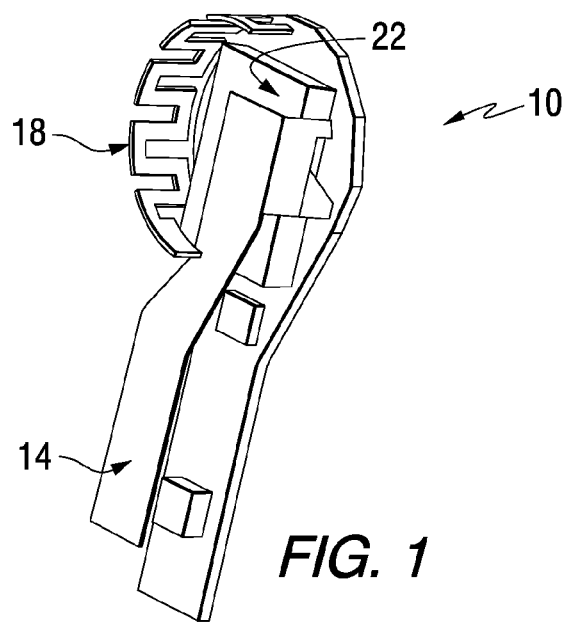
FIG. 1 illustrates an ear-bud comprising at least one antenna constructed according to the teachings of the present invention.

Before describing in detail the exemplary methods and apparatuses related to a tunable diversity antenna for use with a frequency hopping communications protocol, it should be observed that the present invention resides primarily in a novel and non-obvious combination of elements and steps. So as not to obscure the disclosure with details that will be readily apparent to those skilled in the art, certain conventional elements and steps have been presented with lesser detail, while the drawings and the specification describe in greater detail other elements and steps pertinent to understanding the invention.

The following embodiments are not intended to define limits as to the structure or method of the invention, but only to provide exemplary constructions. The embodiments are permissive rather than mandatory and illustrative rather than exhaustive.

In one embodiment of the present invention an antenna of a transmitting device is tuned according to an instantaneous hopping frequency. Collectively the hopping frequencies are within a hopping bandwidth. As the hopping frequency changes responsive to a code or sequence (commonly a pseudorandom code or sequence) generated within the transmitting communications device, the transmitting antenna is tuned to present a new resonant frequency at or near each hop frequency. The receiver employs the same hopping code or sequence information to tune the receiving antenna prior to each hop to a different frequency. Since the receiving antenna frequency is changed according to each hop frequency, the antenna bandwidth can be narrower (i.e., it is not necessary for the bandwidth to include the entire hopping bandwidth). The narrower bandwidth improves the rejection of unwanted signals.

Alternatively, in lieu of retuning the transmitting or receiving antenna responsive to each new hop frequency, the antenna is returned only if a difference between the current hop frequency and the immediately previous hop frequency is greater than a predetermined amount.

In yet another alternative the hopping frequencies are grouped into sub-bands, and the antenna is tuned to a different hopping frequency only when the instantaneous frequency of the received signal is in a different frequency sub-band.

In yet another embodiment, the antenna is tuned responsive to a signal quality metric (the signal-to-noise ratio or $E_b/N_0$) in an effort to maintain a predetermined signal quality characteristic.

In audio playback devices, wireless headphones and ear-buds (and speakers and earphones) are gaining popularity to eliminate the wire tether between the playback device and the sound reproducing device. The audio signal is transmitted from the playback device to the headphones or ear-buds over a wireless radio frequency communications link. To maintain a high level of audio fidelity, the radio frequency signal communications may comprise a frequency-hopping signal. One or more antennas (and perhaps more than one receiving/processing device) are disposed within the sound transducer to receive the radio frequency signal. The radio frequency signal is processed to extract the audio signal therefrom. The audio signal is supplied to the sound reproducing device for generating an acoustic signal that can be heard by the listener.

FIG. 1 illustrates an ear-bud 10 comprising a primary antenna 14 and a diversity antenna 18 for receiving the radio frequency signal (modulated by the audio signal) from the playback device (not shown). In one embodiment a bandwidth of the primary antenna 14 includes the hopping bandwidth (the total bandwidth over which the radio frequency signal hops, that is, the hopping bandwidth includes all of the hopping frequencies) and is not tunable responsive to the hopping frequency. However, the diversity antenna 18 is tunable responsive to the hopping frequency. As the hopping frequency changes (the instantaneous frequency referring to the current hopping frequency), the resonant frequency of the diversity antenna 18 changes to match or closely approximate the hopping frequency.

The received signal from one or both of the primary and diversity antennas 14/18 is supplied to a radio module 22 within the ear-bud 10 for processing and recovering the audio signal; the audio signal drives an audio reproducing device, e.g., ear-bud speakers (not shown). In other embodiments, the audio reproducing device comprises a headphone, an earphone or a speaker. Although the diversity antenna 18 is depicted as a meanderline antenna, the invention is not so limited as any other tunable antenna can be used in place of the illustrated meanderline antenna.

According to one embodiment a control signal from the radio module 22 is applied to the diversity antenna 18 for tuning the antenna's resonant frequency. As described above, the antenna's resonant frequency can be controlled responsive to each frequency hop (or instantaneous frequency), responsive to a frequency change greater than a predetermined amount, responsive to a change to an instantaneous frequency in a different frequency sub-band or responsive to a signal quality metric. Other criterion for tuning the diversity antenna can also be employed and are considered within the scope of the present invention.

Any one of various techniques can be employed to tune or change the resonant frequency of the diversity antenna 18. For example, the antenna effective length (and thus its resonant frequency) can be changed by moving a feed point and/or a ground point to a different location on the antenna structure. Additional radiating segments can be added to or removed from the diversity antenna 18 to change the antenna's effective length and thus its resonant frequency.

One technique for controlling the antenna resonant frequency inserts a variable capacitor in series with the antenna at the feed point. Alternately, a variable capacitor may be placed between the feed point and ground.

In another embodiment the antenna resonant frequency is modified by inserting (switching in) or deleting (switching out) conductive elements of different lengths from the antenna radiating structure. The control signal controls these conductive elements and thus modifies the antenna effective electrical length. For example, a meanderline element having a desired effective electrical length can be selected from among a plurality of meanderline elements (each having a different effective electrical length) and switched in or out of the antenna radiating structure to alter the resonant frequency.

In a preferred embodiment the primary and diversity antennas 14/18 of FIG. 1 operate in the ISM 2.4 GHz frequency band using a proprietary frequency hopping protocol and a radio frequency signal having a relatively low signal power. The control signal produced by the radio module 22 is in digital form and converted to an analog signal in a DAC (digital to analog). The control signal thus comprises a plurality of DC voltages that are supplied to an antenna tuning device over a control line. A variable capacitance diode (varactor) is disposed between a ground terminal of the antenna and ground. Application of different DC voltages to the diode changes the reverse bias diode capacitance presented by the diode and thus the resonant frequency of the antenna. See the embodiments of FIGS. 10-12.

In one embodiment the diversity antenna is adjusted (tuned) only when needed, since the diversity antenna bandwidth may not be so narrow that tuning is required responsive to each frequency hop. The radio module 22 determines (e.g., using a software look-up table) when the antenna resonant frequency requires tuning and produces a control signal that when applied to the antenna tuning device changes the antenna's resonant frequency.

In one application of the invention, the spread spectrum frequency hopping technique allows transmitting different information streams (audio signals) according to different hopping patterns (i.e., a point to multipoint communications link). A diversity antenna within each receiving ear-bud or headphone is thus controlled to respond to the desired frequency-hopping signal, tuning the antenna to follow the hopping frequency as described herein. Thus each ear-bud is responsive to a desired one of the information streams.

Figure 2:
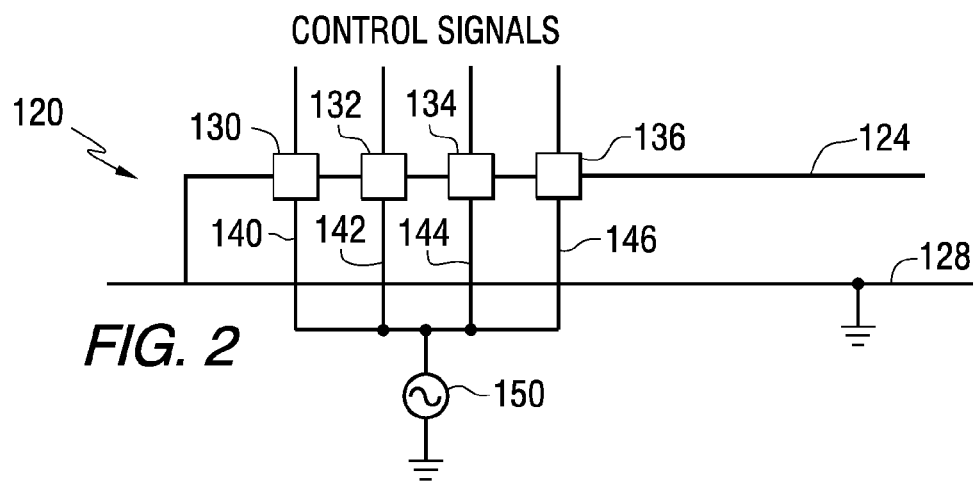
FIGS. 2 and 3 illustrate antennas having controllable characteristics as described by the embodiments of the present invention.

FIG. 2 illustrates an antenna 120 comprising a conductive element 124 disposed over a ground plane 128. Switching elements 130, 132, 134 and 136 switchably connect feed conductors 140, 142, 144 and 146 to a respective location on the conductive element 124, such that a signal source 150 is connected to a different location on the conductive element 124 through one or more closed switching elements 130, 132, 134 and 136. The fed location is selected to provide the desired antenna resonant frequency. The switching elements 130, 132, 134 and 136 are configured into an opened or a closed state in response to control signals supplied from the radio module 22.

Figure 3:
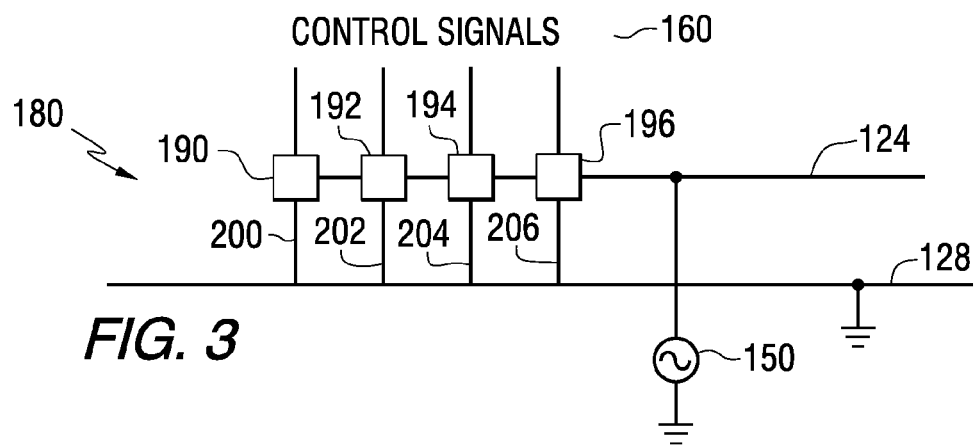

Likewise, connection of the antenna structure to ground may be reconfigured by operation of one or more of a plurality of switching elements that each connect the antenna to ground through a different conductive element and from a different point on the antenna structure. FIG. 3 illustrates an antenna 180 comprising switching elements 190, 192, 194 and 196 for switchably connecting one or more of conductive elements 200, 202, 204 and 206 to the ground plane 128, thereby connecting different locations on the antenna 124 to the ground plane. Appropriate one(s) of the switching elements 200, 202, 204 and 206 are closed or opened responsive to the supplied control signals to affect the antenna resonant frequency.

Although the teachings of the present invention are described in conjunction with a PIFA antenna (planar-inverted F antenna) of FIGS. 2 and 3, the teachings are applicable to other types of antennas, including monopole and dipole antennas, patch antennas, meanderline antenna, helical antennas and dielectric resonant antennas, as well as combination antennas, such as spiral/patch, meanderline loaded PIFA, ILA and others.

The switching elements identified in FIGS. 2 and 3 can be implemented by discrete switches (e.g., PIN diodes, control field effect transistors, micro-electro-mechanical systems, or other switching technologies known in the art) to move the feed tap (feed terminal) point or the ground tap (ground terminal) point on the antenna structure. At any instant, more than one of the switches can be closed to connect more than one point on the antenna structure to ground or to the feed terminal. The switching elements can also comprise organic laminate carriers attached to the antenna structure to form a module comprising the antenna and a substrate on which the antenna and its associated components are mounted.

Figure 4:
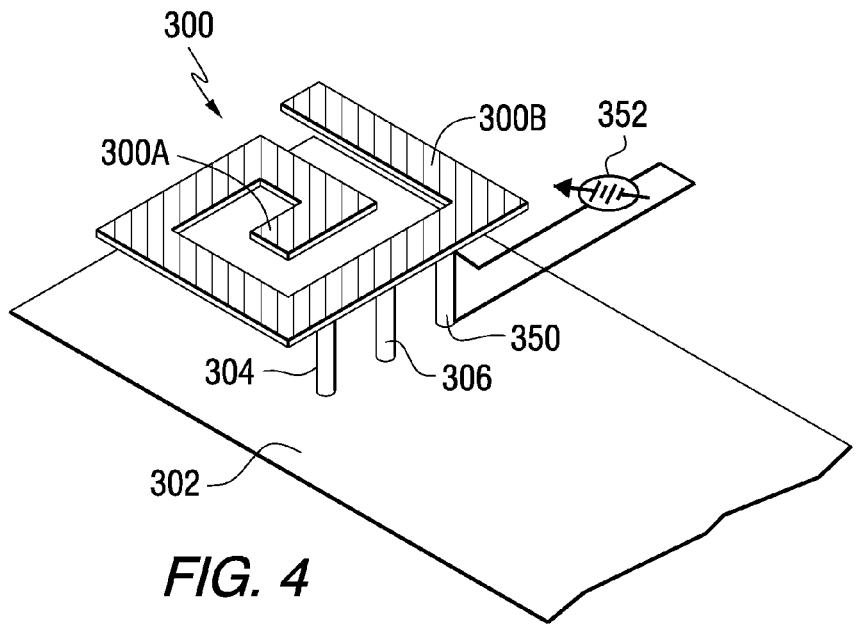
FIG. 4 illustrates an embodiment of the present invention for use with a spiral antenna.

FIG. 4 illustrates an antenna 300 (in this example the antenna 300 comprises a spiral antenna, but the teachings of the present invention are not limited to spiral antennas) mounted proximate or above a ground plane 302 disposed within the ear-bud 10 or headphone. The antenna 300 further comprises an inner spiral segment 300A and an outer spiral segment 300B. A ground terminal 304 of the antenna 300 is connected to the ground plane 302. A feed terminal 306 is connected to the radio module 22.

Figure 5:
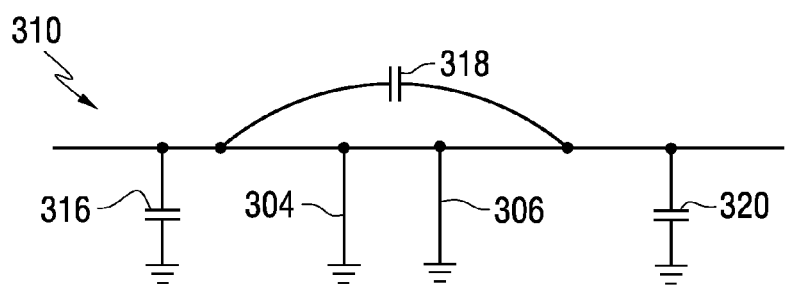
FIG. 5 illustrates an equivalent circuit of the antenna of FIG. 4.

An equivalent circuit 310 of the antenna 300 is illustrated in FIG. 5 including parasitic capacitances 316, 320 and 318 formed by coupling between the inner spiral segment 300A and the ground plane 302, the outer spiral segment 300B and the ground plane 302 and the inner spiral segment 300A and the outer spiral segment 300B, respectively.

According to the teachings of one embodiment of the present invention, one or more of these parasitic capacitances is modified to change the resonant frequency of the antenna 300. For example, a varactor diode, as described above, can be added in series or parallel with one or more of the parasitic capacitances 316, 318 and 320, forming a series or parallel capacitor circuit comprising one fixed-value capacitor (the parasitic capacitance) and one controllable capacitance (the varactor diode).

Figure 6:
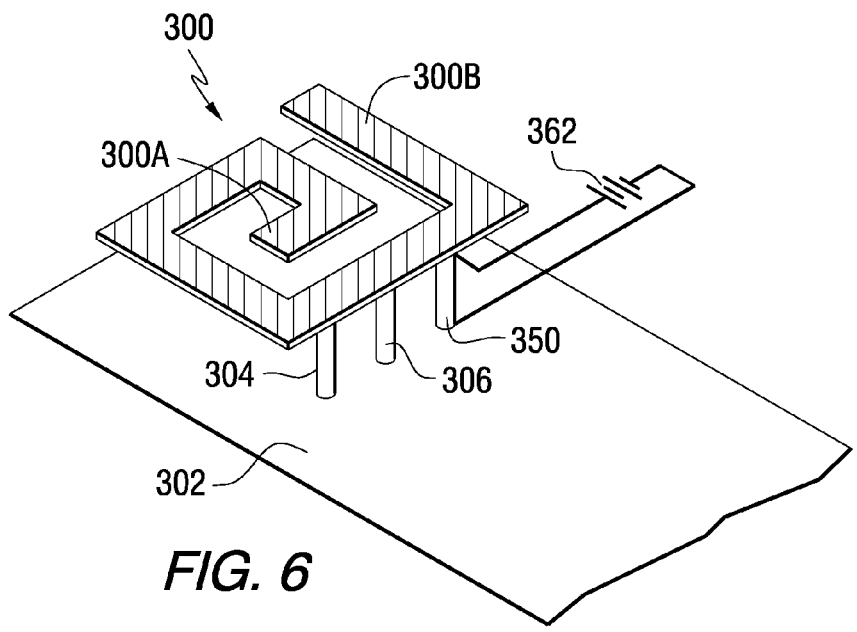
FIG. 6 illustrates another embodiment of the present invention for use with a spiral antenna.

As shown in FIG. 6, the antenna 300 further comprises a varactor diode 350 (or in another embodiment an electrically controllable capacitor) responsive to a variable voltage source 352 for altering the capacitance of the varactor diode 350 (or the capacitance of the electrically controllable capacitor) and thus the capacitance between the antenna 300 and the ground plane 302. The antenna resonant frequency is accordingly changed by the capacitance change as controlled by the voltage of a voltage source 362. The controllable voltage represents the control signal supplied by the radio module 22. Any of the control schemes described herein can be used to generate the control signal and any of the parasitic capacitances can be accordingly changed. In addition to the use of a varactor, the capacitance can be changed by other techniques that are considered within the scope of the present invention.

According to another embodiment, an inductance of the antenna 300 is modified to change the antenna's resonant frequency (including the fundamental resonant frequency and other resonant modes). Such an inductance can be in series or in parallel (to ground) with the antenna 300. Thus either an inductive or a capacitive reactive component (or both) of the antenna reactance can be modified to change the resonant frequency.

Figure 7:
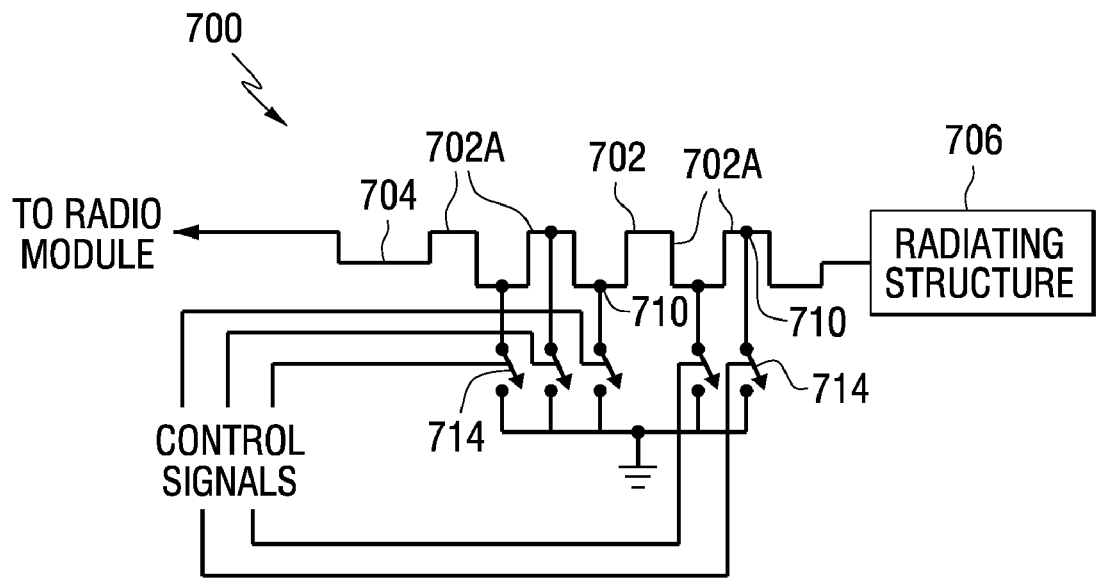
FIGS. 7 and 8 illustrate antennas having controllable meanderline segments for modifying antenna characteristics according to the present invention.
Figure 8:
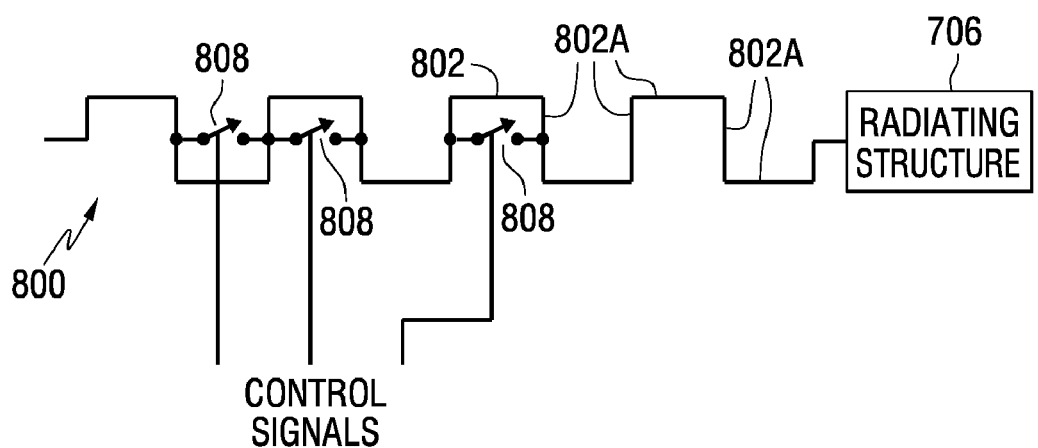

FIGS. 7 and 8 illustrate additional configurable or controllable antennas that can be tuned, responsive to a frequency-hopping signal for example, according to the teachings of the present invention. An antenna 700 in FIG. 7 comprises a meanderline structure 702 further comprising a plurality of meanderline segments 702A, a first terminal end connected to a feed 704 and a second terminal end connected to a radiating/receiving structure 706. Exemplary taps 710 connected to one or more of the meanderline segments 702A are connected to ground by closing an associated switch 714 under control of the control signal. Connecting one or more of the meanderline segments 702A to ground influences the antenna resonant frequency. In another embodiment the radiating/receiving structure 706 is absent and the meanderline structure 702 comprises the energy receiving/radiating structure.

The meanderline structure 702 is a slow wave structure where the physical dimensions of the conductor comprising the meanderline structure 702 are not equal to its effective electrical dimensions. Generally, a slow-wave conductor or structure is defined as one in which the phase velocity of the traveling wave is less than the free space velocity of light. The phase velocity is the product of the wavelength and the frequency and takes into account the material permittivity and permeability of the material on which the meanderline structure is formed, i.e., $c/((sqrt(\in_r)sqrt(\mu_r))=\lambda f$. Since the frequency remains unchanged during propagation through the slow wave meanderline structure 702, if the wave travels slower (i.e., the phase velocity is lower) than the speed of light in a vacuum (c), the wavelength of the wave in the structure is lower than the free space wavelength. The slow-wave structure de-couples the conventional relationships among physical length, resonant frequency and wavelength, permitting use of a physically shorter conductor since the wavelength of the wave traveling in the conductor is reduced from its free space wavelength.

In one embodiment the antenna 700 of FIG. 7 is formed on or within a dielectric substrate. Thus the permittivity and the permeability of the dielectric material comprising the substrate affect the properties of the meanderline structure 702, and thus the properties of the antenna 700.

In another embodiment the ground and the feed 704 of the antenna 700 are reversed, such that one or more of the meanderline segments 702A supply a received signal to the radio module 22 through one or more of the closed switches 714.

FIG. 8 illustrates an antenna 800 comprising a meanderline structure 802 further comprising a plurality of meanderline segments 802A and exemplary switches 808 controlled by the control signals to provide discrete resonant frequency tuning of the antenna 800. Since the meanderline structure 802 forms a portion of the antenna and therefore influences the antenna parameters, including the resonant frequency, shorting one or more of the meanderline segments 802A changes the resonant length and thus the resonant frequency of the antenna 800. One or more of the switches 808 can be closed/opened to tune the antenna 800 to a desired frequency. Generally, tuning by operation of the switches 808 results in discrete, rather than continuous, tuning of the resonant frequency.

The switching elements identified in the various Figures of the present application can be implemented by discrete switches (e.g., PIN diodes, control field effect transistors, micro-electro-mechanical systems, or other switching technologies known in the art). The switching elements can comprise organic laminate carriers attached to the antenna to form a module comprising the antenna (e.g., the meanderline structures and the radiating/receiving structure) and the controlling switches on a single dielectric substrate.

FIG. 9 illustrates a frequency band of interest according to one embodiment of the invention. Within the 2.4 to 2.5 GHz frequency band the antenna can be tuned to five different resonant frequencies as shown by the points where the curves intersect the x-axis in the interval between 2.4 and 2.5 GHz. A sixth resonant frequency lies outside the band of interest above 2.5 GHz but may be useful for hopping frequencies at a high end of the band.

FIGS. 10 and 11 illustrate the application of the embodiments of the present invention to a PIFA antenna. In FIG. 10 an antenna 900 is grounded through a variable capacitor 904 (e.g., a variable capacitance diode (varactor)) to change the antenna's resonant frequency. In the case of a variable capacitance diode, the control signal comprises a DC voltage. As described above, application of different DC voltage to the diode changes the reverse bias diode capacitance.

In FIG. 11 a plurality of fixed value capacitors 906 (or for example, variable capacitance diodes each responsive to a selectable DC voltage) are selectively switchably connected to an end region 908 of an antenna 910. Closing one or more switches 916 (including interdigital switches) inserts the associated capacitor into the antenna circuit to affect the antenna's resonant frequency.

An antenna 940 of FIG. 12 illustrates a variable capacitor 944 in series with the antenna 940. Changing the capacitance of the capacitor 944 tunes the antenna.

While the present invention has been described with reference to preferred embodiments, it will be understood by those skilled in the art that various changes may be made and equivalent elements may be substituted for the elements thereof without departing from the scope of the invention. The scope of the present invention further includes any combination of elements from the various embodiments set forth herein. In addition, modifications may be made to adapt a particular situation to the teachings of the present invention without departing from its essential scope. Therefore, it is intended that the invention not be limited to the particular embodiments disclosed, but that the invention will include all embodiments falling within the scope of the appended claims.

What is claimed is:

1. A receiver for receiving a frequency-hopping signal having an instantaneous frequency within a hopping bandwidth, the receiver comprising:
a first antenna having a bandwidth including the hopping bandwidth for producing a first received signal;
a second antenna tunable to frequencies within the hopping bandwidth responsive to an instantaneous hopping frequency, the second antenna for producing a second received signal;
a module connected to the first and second antennas for processing one or both of the first and the second received signals to produce an information signal; and
wherein the frequency-hopping signal has a first instantaneous frequency at a first time and changes to a second instantaneous frequency at a second time, a control signal for tuning the second antenna to the second instantaneous frequency at the second time when a difference between the first and the second instantaneous frequencies exceeds a predetermined amount.

2. The receiver of claim 1 the information signal for driving an audio reproducing device.

3. The receiver of claim 2 the audio reproducing device comprising one of a headphone, an earphone, a speaker and an ear-bud.

4. The receiver of claim 1, wherein the hopping bandwidth comprises a first and a second sub-band, the second antenna tuned to the first sub-band responsive to an instantaneous frequency within the first sub-band and tuned to the second sub-band responsive to the instantaneous frequency in the second sub-band.

5. The receiver of claim 4 the second antenna tuned to the second sub-band when a signal quality metric of the frequency-hopping signal drops below a predetermined signal quality metric.

6. The receiver of claim 1 the control signal for configuring one or more structural elements of the second antenna for tuning the second antenna.

7. The receiver of claim 6 the one or more structural elements of the second antenna comprising a feed terminal, a ground terminal and an effective electrical length.

8. The receiver of claim 7 the control signal for opening or closing a switch to reposition the feed terminal or the ground terminal.

9. The receiver of claim 8 wherein the switch comprises a discrete switch, a PIN diode, a control field effect transistor or a micro-electro-mechanical system.

10. The receiver of claim 6 the control signal for controlling an effective electrical length by changing a physical length of the second antenna.

11. The receiver of claim 1 further comprising a controller for producing the control signal responsive to a signal quality metric of the second received signal.

12. The receiver of claim 1 further comprising a controller for producing the control signal that controls an effective electrical length of the second antenna by inserting a capacitor or an inductor at a feed terminal of the second antenna.

13. The receiver of claim 12 wherein the capacitor comprises a varactor diode having a variable capacitance responsive to the control signal or an electrically controllable capacitor.

14. The receiver of claim 1 wherein the first and the second antennas each comprise a planar inverted F antenna (PIFA) antenna.

15. The receiver of claim 1 wherein the second antenna comprises one or more switching elements responsive to the control signal for tuning the second antenna.

16. The receiver of claim 1 wherein the second antenna comprises a spiral antenna further comprising an inner spiral and an outer spiral, the control signal for controlling a parasitic capacitance between the inner and the outer spirals to tune the second antenna.

17. The receiver of claim 1 wherein the second antenna comprises a meanderline antenna, the control signal for controlling an effective electrical length of the meanderline antenna.

18. The receiver of claim 17 wherein the meanderline antenna comprises a plurality of switchable taps and the effective electrical length is controlled by opening or closing one or more of the switchable taps.

19. The receiver of claim 1 wherein the bandwidth of the first antenna is fixed.

20. The receiver of claim 1 the module for selecting one of the first and the second received signals to produce the information signal therefrom, the selection responsive to a characteristic of the first and the second signals.

21. The receiver of claim 1 wherein information carried by the first signal is different from information carried by the second signal.

22. The receiver of claim 21 wherein the information carried by the first signal and the information carried by the second signal drive a respective first audio reproducing device and second audio reproducing device.

23. A sound reproducing device for receiving a frequency-hopping signal having an instantaneous frequency within a hopping bandwidth, the sound reproducing device comprising:
- a first antenna having a bandwidth including the hopping bandwidth for producing a first received signal;
- a second antenna tunable to frequencies within the hopping bandwidth responsive to an instantaneous hopping frequency, the second antenna for producing a second received signal;
- a module for processing one or both of the first and the second received signals to produce a signal for driving the sound reproducing device; and wherein the frequency-hopping signal has a first instantaneous frequency at a first time and changes to a second instantaneous frequency at a second time, the receiver further comprising a control signal for tuning the second antenna to the second instantaneous frequency when the difference between the first and the second instantaneous frequencies exceeds a predetermined amount.

24. The sound reproducing device of claim 23, wherein the hopping bandwidth comprises a first and a second sub-band, the second antenna tuned to the first sub-band responsive to an instantaneous frequency within the first sub-band and tuned to the second sub-band responsive to the instantaneous frequency in the second sub-band.

25. The sound reproducing device of claim 24 the second antenna tuned to the second sub-band when a signal quality metric of the frequency-hopping signal drops below a predetermined signal quality metric.

26. The sound reproducing device of claim 24 further comprising a controller for producing one or more control signals responsive to the instantaneous hoping frequency for configuring one or more structural elements of the second antenna for tuning the second antenna.

27. The sound reproducing device of claim 24 wherein the second antenna comprises one or more switching elements responsive to one or more control signals for tuning the second antenna.

28. The sound reproducing device of claim 24 wherein the bandwidth of the first antenna is fixed.

* * * * *